United States Patent
Cappellotto

(10) Patent No.: US 6,205,664 B1
(45) Date of Patent: *Mar. 27, 2001

(54) SPOKE-NIPPLE AND A METHOD FOR ITS MANUFACTURE

(75) Inventor: Guido Cappellotto, Arcore (IT)

(73) Assignee: Alpina Raggi S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/799,210

(22) Filed: Feb. 13, 1997

(30) Foreign Application Priority Data

Oct. 24, 1996 (IT) .................................. 96A000261

(51) Int. Cl.$^7$ .............................. B21D 53/26; B60B 1/04
(52) U.S. Cl. ......................... 29/894.33; 301/58; 301/61; 411/302
(58) Field of Search ................... 301/55, 58, 61, 301/104, 110.5; 411/302, 303, 304, 928; 29/894.33, 894.394, 894.341, 894.342, 894.333

(56) References Cited

U.S. PATENT DOCUMENTS

| 556,124 | * | 3/1896 | Wolff | 301/61 X |
| 2,450,694 | * | 10/1948 | Sauer | 411/303 |
| 2,778,690 | * | 1/1957 | Horling, Jr. | 301/58 |
| 3,289,724 | * | 12/1966 | Ernest | 411/303 |
| 5,673,976 | * | 10/1997 | Hillis et al. | 301/58 |

FOREIGN PATENT DOCUMENTS

825657  *  7/1949  (DE) ...................................... 301/56

* cited by examiner

Primary Examiner—Russell D. Stormer
(74) Attorney, Agent, or Firm—Sughrue, Mion, Zinn, Macpeak & Seas, PLLC

(57) ABSTRACT

A spoke nipple comprises a body of substantially undeformable material with a head and a shank which have an at least partially threaded axial hole for housing the thread of a spoke, and with a perforated insert of substantially deformable material fixed to the body with the holes in the body and in the insert arranged coaxially, the insert having an inside diameter such as to house the thread of the spoke with interference when it is screwed into the axial hole in the nipple body.

1 Claim, 2 Drawing Sheets

SPOKE-NIPPLE AND A METHOD FOR ITS MANUFACTURE

BACKGROUND OF THE INVENTION

The subject of the present invention is a spoke nipple comprising a body of substantially undeformable material with a head and a shank which have an at least partially threaded axial hole for housing the thread of a spoke. The invention also relates to a method of manufacturing the nipple.

Nipples having the characteristics indicated above are used widely in the construction of spoked wheels, for restraining the threaded end of the spoke on the rim of the wheel.

In this field, it has been noticed in the past in wheels with conventional spokes and, more recently, with some types of spokes, particularly so-called straight spokes which do not have a bend at the axially opposite end to the thread for the attachment of the nipple, that the nipple may slowly unscrew under load, in use. This leads to inadequate functioning of the wheel owing to the gradual loosening of the nipples, and consequently to a dangerous weakening of the wheel as a whole.

To prevent this problem, some wheel assemblers use special adhesives or glues which are spread on the threaded portions of the spoke and/or of the nipple before it is tightened. However, the effect of these glues is difficult to control—in some cases they may completely block the nipple, preventing its subsequent removal—and, in any case, the effect is cancelled out if the wheel is subjected to successive adjustments of the tension in the spokes involving the release of one or more nipples.

The technical problem upon which the invention is based is that of providing a spoke nipple which overcomes the problems complained of with reference to the prior art mentioned.

SUMMARY OF THE INVENTION

This problem is solved by the invention by means of a nipple having the aforementioned features and characterized in that it comprises a perforated insert of substantially deformable material which is fixed to the body with the holes in the insert and in the body arranged coaxially, the hole in the insert having an inside diameter such as to house the thread of the spoke with interference when it is screwed into the hole in the body.

BRIEF DESCRIPTION OF THE DRAWINGS

The characteristics and advantages of the invention will become clearer from the following detailed description of a preferred embodiment thereof, shown by way of non-limiting example in the appended drawings, in which.

DETAILED DESCRIPTION OF THE INVENTION

Figure 1:
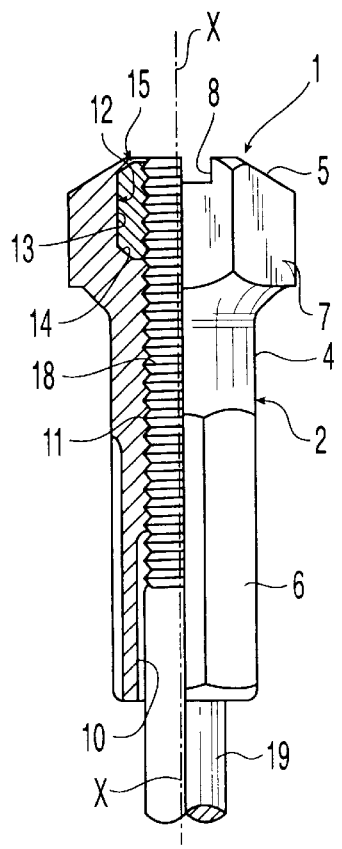
FIG. 1 shows a nipple formed according to the present invention, half as a front elevational view and half in longitudinal section.
Figure 4:
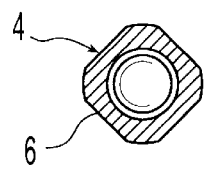
Figure 5:
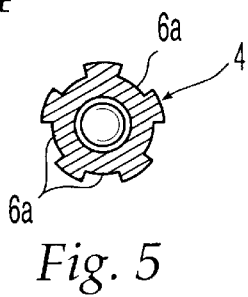
Figure 7:
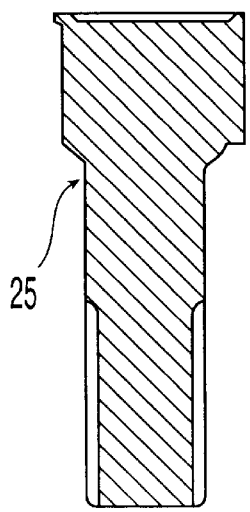
FIGS. 7 to 11 are longitudinal sections of the nipple of FIG. 6 in the various stages of manufacture.
Figure 8:
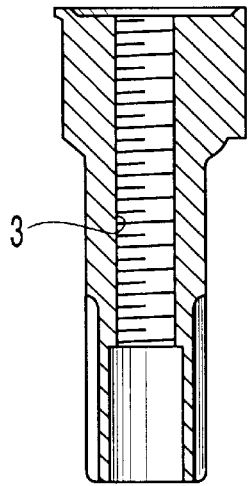

With reference to FIG. 1, a nipple 1 formed in accordance with the invention comprises a metal body 2 which has an axis X and an axial hole 3, and in which a shank 4 and a head 5 with a polygonal key portion 7, possibly with a notch 8 for a screwdriver, are identified. A further key portion 6 formed on the outside of the shank 4 on an end portion thereof is also polygonal, generally square, in plan (FIG. 4) but, in a possible variant of the invention, may have the configuration of FIG. 5, that is a grooved profile 6a.

At the opposite end to the head 5, the axial hole 3 has an enlarged mouth 10 followed by a threaded portion 11, the hole 3 terminating, at the free end of the head 5, in a greatly enlarged seat 12. In this seat, a wall 13 with a cylindrical surface of axis X, a shoulder 14 close to the threaded portion 11, and a lip 15 at the axially opposite end can be seen. An insert 16 of plastics material or another material which is relatively deformable, at least relative to the low deformability of the metal body 2, is force-fitted in the seat 12. The insert 16 has an axial hole 17 in which a threaded portion 18 of a spoke 19 screwed into the nipple 1 can engage by screwing, forming its own thread but maintaining an interference fit with the insert 16.

Figure 2:
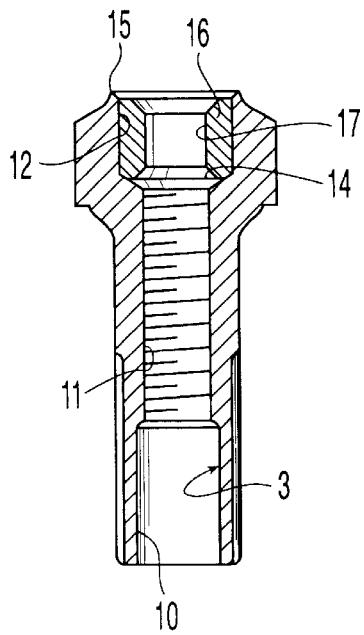
FIGS. 2 and 3 are longitudinal sections of two successive stages of the manufacture of the nipple of FIG. 1, FIGS. 4 and 5 are a section of the nipple of the preceding drawings taken on the line IV—IV of FIG. 3, and a corresponding section of a variant thereof, respectively.
Figure 3:
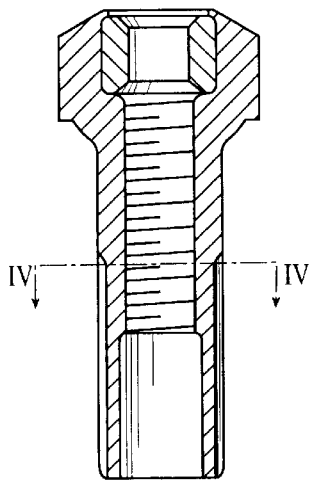

In the embodiment of FIGS. 1 to 3, the seat 12 has a cylindrical surface and the insert 16 is in the shape of a tubular sleeve which has a chamfered end and is fitted in the seat 12 after the threading of the hole 3, being held therein by the upsetting of the lip 15 from the position of FIG. 2 to that of FIG. 3.

Figure 6:
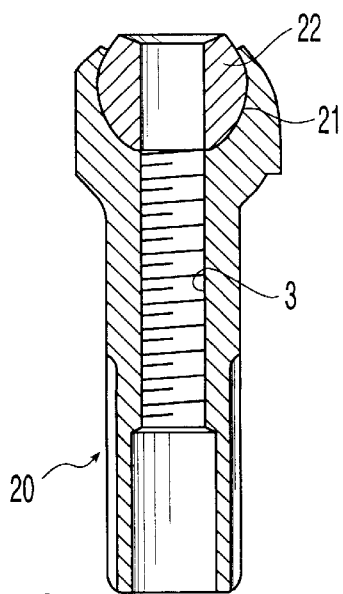
FIG. 6 is a longitudinal section of a variant of the nipple of the invention.

In a variant of the invention, generally indicated 20 in FIG. 6, the seat 21 is generally spherical and the external shape of the insert 22 is also spherical. The insert is fitted in the seat 21 before the hole 3 is machined so that the hole is formed simultaneously in the body 2 and in the insert 22, thus achieving a better guarantee that the holes are coaxial. This aspect is particularly important on account of the very small dimensions of the nipple of the invention, owing to which serious problems may arise in the coaxial arrangement of the holes during separate machining of the body 2, particularly the seat 21, and of the insert 22.

Figure 9:
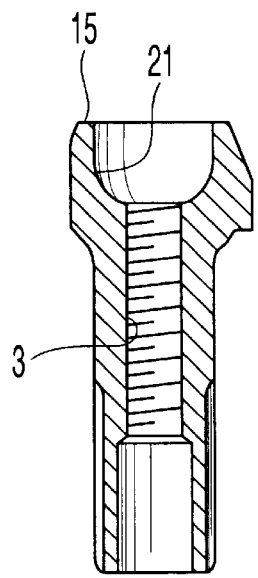
Figure 10:
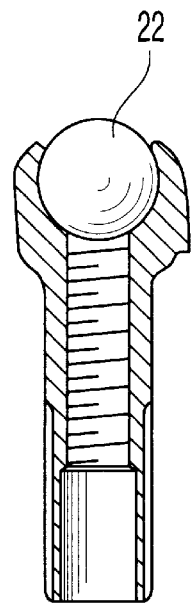
Figure 11:
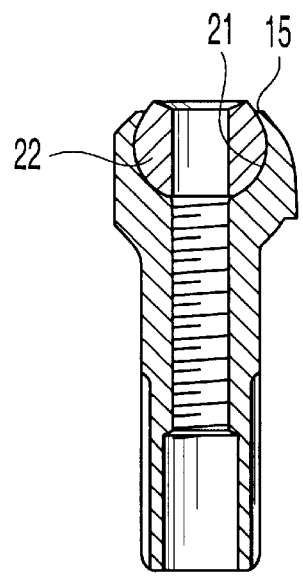

With reference specifically to FIGS. 7 to 11, however, it is envisaged that the metal body 2 of the nipple 20 will be produced from a blank 25 (FIG. 7) produced, for example, by upsetting or moulding, and that the hole 3, complete with the thread 11 (FIG. 8) as well as the seat 21, will then be formed therein, although without the upsetting of the lip 15 (FIG. 9). The insert 22 will then be fitted, without a hole (FIG. 10), and the lip 15 will be upset so as to lock it in the seat 21. It will be noted that the spherical shape of the insert facilitates its positioning in the seat 21 and prevents it from being damaged during the upsetting of the lip 15 by virtue of the optimal distribution of the forces achieved precisely by virtue of the spherical shape. The insert will then be perforated with a tool from the head end 5 and machined to the final shape of FIG. 11.

It will also be noted that the axial extent (SI) of the insert is quite large relative to the axial extent (SF) of the threaded portion of the nipple. Preferred values of this ratio (SI/SF) are between 0.2 and 0.4.

The invention thus conceived achieves the results set as well as many advantages in comparison with conventional nipples. In particular, it achieves effective clamping which is not dependent upon actions of the assembler of the wheel. The clamping is repeatable, even if the nipple is subsequently rotated relative to the spoke during the adjustment of the wheel and the result offers a lasting guarantee of safety of the wheel. Moreover, the use of approximately spherical inserts facilitates the location and clamping of the nipple in the body, particularly with small nipples. Finally, the solution of the second embodiment, that is, the simultaneous machining of the hole in the body of the nipple and in the insert solves any problems with the coaxial arrangement of the holes resulting from the small dimensions of the respective details.

What is claimed is:

1. A method of manufacturing a spoke nipple comprising a body of substantially undeformable material with a head and a shank which has a partially threaded axial hole for housing a threaded spoke comprising the steps of:

providing an insert of substantially deformable plastics material, providing a seat formed at a free end of the head for housing said insert, fixing said insert to the body in said seat and providing a hole in the insert, the holes in the insert and in the body being arranged coaxially with the hole in the insert having an inside diameter such as to house the threaded spoke with interference when it is screwed into the hole in the body, and wherein the holes in the body and in the insert are formed simultaneously while the insert is restrained in the seat in the body.

* * * * *